US012369002B2

(12) United States Patent
Lindberg

(10) Patent No.: US 12,369,002 B2
(45) Date of Patent: *Jul. 22, 2025

(54) EARPIECE WITH CANAL MICROPHONE, AMBIENT MICROPHONE AND RECEIVER

(71) Applicant: GN Hearing A/S, Ballerup (DK)

(72) Inventor: Erik Alan Lindberg, Hampshire, IL (US)

(73) Assignee: GN HEARING A/S, Ballerup (DK)

( * ) Notice: Subject to any disclaimer, the term of this patent is extended or adjusted under 35 U.S.C. 154(b) by 142 days.

This patent is subject to a terminal disclaimer.

(21) Appl. No.: 18/337,395

(22) Filed: Jun. 19, 2023

(65) Prior Publication Data

US 2023/0336931 A1 Oct. 19, 2023

Related U.S. Application Data

(63) Continuation of application No. 17/192,872, filed on Mar. 4, 2021, now Pat. No. 11,882,408, which is a (Continued)

(51) Int. Cl.
*H04R 25/00* (2006.01)
*H04R 1/10* (2006.01)

(52) U.S. Cl.
CPC ......... *H04R 25/604* (2013.01); *H04R 1/1075* (2013.01); *H04R 25/652* (2013.01);

(Continued)

(58) Field of Classification Search
CPC .. H04R 25/604; H04R 1/1075; H04R 25/652; H04R 1/1016; H04R 1/1083; H04R 2225/025; H04R 2410/05

(Continued)

(56) References Cited

U.S. PATENT DOCUMENTS 7,039,195 B1 * 5/2006 Svean ..................... A61F 11/08 381/72
9,219,953 B2 12/2015 Shimizu (Continued)

FOREIGN PATENT DOCUMENTS

| | | | |
|---|---|---|---|
| EP | 427251 | A3 | 4/1992 |
| EP | 1427251 | A2 | 6/2004 |
| WO | WO 2015/179975 | A1 | 12/2015 |

OTHER PUBLICATIONS

Final Office Action for U.S. Appl. No. 17/192,872 dated Feb. 8, 2023.

(Continued)

*Primary Examiner* — Carolyn R Edwards
*Assistant Examiner* — Julie X Dang
(74) *Attorney, Agent, or Firm* — Vista IP Law Group, LLP

(57) ABSTRACT

An earpiece for a hearing device, includes: an earpiece housing comprising an ear canal portion and an outer ear portion, the ear canal portion extending along an ear canal axis for positioning in an ear canal of a user, the ear canal portion having a first end; a first microphone for detecting ambient sound via a first input port in the earpiece housing; a second microphone; and a receiver for providing an audio output signal to the ear canal when the earpiece is inserted in an ear of the user; wherein the first microphone is arranged at a first distance from the first input port, wherein the first distance is at least 2 mm when measured parallel to a main plane having a main plane normal parallel to a main axis, the main axis forming a first main angle that is less than 30 degrees with the ear canal axis.

23 Claims, 9 Drawing Sheets

Related U.S. Application Data continuation of application No. 16/716,474, filed on Dec. 16, 2019, now Pat. No. 11,026,030, which is a continuation of application No. 15/691,624, filed on Aug. 30, 2017, now Pat. No. 10,542,358.

(52) U.S. Cl.
CPC .......... *H04R 1/1016* (2013.01); *H04R 1/1083* (2013.01); *H04R 2225/025* (2013.01); *H04R 2410/05* (2013.01)

(58) Field of Classification Search
USPC ............................... 381/381, 380, 71.6, 71.7
See application file for complete search history.

(56) References Cited

U.S. PATENT DOCUMENTS 9,473,858 B2 10/2016 Pedersen et al.
10,542,358 B2 1/2020 Lindberg
11,882,408 B2 * 1/2024 Lindberg ............. H04R 25/604
2003/0221902 A1 12/2003 Stinauer et al.
2006/0034476 A1 2/2006 Glezerman
2007/0147635 A1 * 6/2007 Dijkstra ................. H04B 1/123 381/94.1
2007/0160243 A1 * 7/2007 Dijkstra ................. H04R 25/00 381/328
2007/0189563 A1 8/2007 Sjursen et al.
2011/0103605 A1 5/2011 Killion et al.
2012/0063622 A1 * 3/2012 Bruckhoff ............ H04R 1/1016 381/328
2013/0028434 A1 1/2013 Sibbald et al.
2013/0028462 A1 1/2013 Chen
2014/0146989 A1 * 5/2014 Goldstein ................ H04R 1/10 381/380
2014/0153733 A1 6/2014 Llewellyn
2014/0226832 A1 8/2014 Shimizu
2014/0233749 A1 8/2014 Shimizu et al.
2015/0023510 A1 * 1/2015 Shimizu ............... H04R 1/1016 381/58
2015/0023542 A1 * 1/2015 Shimizu ............... H04R 1/1075 381/380
2015/0215701 A1 * 7/2015 Usher .................. H04R 1/1041 381/71.6
2016/0050474 A1 2/2016 Rye et al.
2017/0094386 A1 3/2017 Trainer et al.
2018/0176674 A1 6/2018 Tang et al.

OTHER PUBLICATIONS

Non-Final Office Action for U.S. Appl. No. 17/192,872 dated Jul. 6, 2022.
Amendment Response to NFOA for U.S. Appl. No. 17/192,872 dated Nov. 7, 2022.
Amendment Response to FOA for U.S. Appl. No. 17/192,872 dated Apr. 5, 2023.
Notice of Allowance for U.S. Appl. No. 17/192,872 dated Jun. 12, 2023.
Non-Final Office Action for U.S. Appl. No. 16/716,474 dated Nov. 3, 2020.
Non-Final Office Action for U.S. Appl. No. 16/716,474 dated Feb. 20, 2020.
Amendment Response to NFOA for U.S. Appl. No. 16/716,474 dated Jan. 6, 2021.
Amendment Response to NFOA for U.S. Appl. No. 16/716,474 dated Jun. 22, 2020.
Notice of Allowance for U.S. Appl. No. 16/716,474 dated Jan. 28, 2021.
Extended European Search Report for EP Patent Appln. No. 18181704.0 dated Jan. 4, 2019.
Non-Final Office Action dated Sep. 27, 2018 for related U.S. Appl. No. 15/691,624.
Final Office Action dated Apr. 26, 2019 for related U.S. Appl. No. 15/691,624.
Notice of Allowance dated Sep. 12, 2019 for related U.S. Appl. No. 15/691,624.

* cited by examiner

EARPIECE WITH CANAL MICROPHONE, AMBIENT MICROPHONE AND RECEIVER

RELATED APPLICATION DATA

This application is a continuation of U.S. patent application Ser. No. 17/192,872 filed on Mar. 4, 2021, which is a continuation of U.S. patent application Ser. No. 16/716,474, filed on Dec. 16, 2019, now U.S. Pat. No. 11,026,030, which is a continuation of U.S. patent application Ser. No. 15/691,624, filed on Aug. 30, 2017, now U.S. Pat. No. 10,542,358. The entire disclosures of the above applications are expressly incorporated by reference herein.

FIELD

The present disclosure relates to an earpiece for a hearing device, an in particular for a hearing device with hearing protection.

BACKGROUND

Earpieces are used in a large variety of situations, where an audio signal is presented to the user via the earpiece. Further, earpieces are used in communication systems for presenting to and/or receiving audio signals from the user.

In two-part hearing devices with an earpiece and an external device, the earpiece is typically connected to the external device by a cable comprising one or more wires and/or a sound guiding channel.

Earpieces for hearing devices are typically worn for many hours and therefore wearing comfort is of key importance for a hearing device user. In many hearing aids, the earpiece is specifically fitted to a hearing device user, which is a costly and tedious process. Further, the position of the sound inlet of the external or ambient microphone plays an important role in the signal processing requirements for the hearing device.

SUMMARY

Accordingly, there is a need for hearing device earpieces with improved wearing comfort and which requires little or no customization.

Accordingly, an earpiece for a hearing device is provided, the earpiece comprising an earpiece housing comprising an ear canal portion and an outer ear portion, the ear canal portion extending along an ear canal axis for positioning in an ear canal of a user, the ear canal portion having a first end; a first microphone, optionally for detecting ambient sound via a first input port in the earpiece housing; a second microphone, optionally for detecting ear canal sound, e.g. via an ear canal opening in the earpiece housing; and a receiver for providing an audio output signal to the ear canal, e.g. via an ear canal opening in the earpiece housing, when the earpiece is inserted in the ear of the user. The first microphone is optionally arranged at a first distance from the first input port. The first distance may be at least 2 mm, e.g. when measured parallel to a main plane having a main plane normal parallel to a main axis. The main axis may form a first main angle with the ear canal axis less than 30 degrees.

Further, a hearing device comprising a processing part and an earpiece as described herein is provided. The earpiece comprises a cable configured to connect or connecting the processing part and the earpiece.

The present earpiece and hearing device provide improved wearing comfort to a user. Further, the earpiece reduces the need for customized fitting and/or allows for an ear piece with reduced size. Further, the present disclosure provides a compact earpiece with two microphones and a receiver.

Further, the present earpiece reduces the need for complex processing of microphone signals.

An earpiece for a hearing device, includes: an earpiece housing comprising an ear canal portion and an outer ear portion, the ear canal portion extending along an ear canal axis of the earpiece for positioning in an ear canal of a user, the ear canal portion having a first end; a first microphone for detecting ambient sound via a first input port in the earpiece housing; a second microphone; and a receiver for providing an audio output signal to the ear canal when the earpiece is inserted in an ear of the user; wherein the first microphone is arranged at a first distance from the first input port, wherein the first distance is at least 2 mm when measured parallel to a main plane having a main plane normal parallel to a main axis, the main axis forming a first main angle that is less than 30 degrees with the ear canal axis.

Optionally, a first input port distance from a center of the first input port to the ear canal axis is less than 5 mm when measured parallel to the main plane.

Optionally, the first distance is measured parallel to the main plane from a center of the first input port to the first microphone.

Optionally, the earpiece comprises a first sound guide structure for guiding sound from the first input port to the first microphone, the first sound guide structure forming an audio channel extending parallel to or at an angle less than 20 degrees to the main plane.

Optionally, the first sound guide structure has an input opening and an output opening, and wherein a distance between the input opening and the output opening of the first sound guide structure is at least 3 mm when measured parallel to the main plane.

Optionally, an extent of the first microphone, an extent of the second microphone, and an extent of the receiver, when projected into the main plane, are arranged side-by-side with no overlap.

Optionally, a distance between the first microphone and the second microphone, when projected into the main plane, is at least 3 mm.

Optionally, a distance between the first microphone and the receiver, when projected into the main plane, is at least 2 mm.

Optionally, the first microphone has a first membrane with a first membrane normal, and wherein the first membrane normal forms a first primary membrane angle that is less than 45 degrees with respect to the ear canal axis.

Optionally, the second microphone has a second membrane with a second membrane normal, and wherein the second membrane normal forms a second primary membrane angle with the ear canal axis, the second primary membrane angle being in a range from 45 degrees to 90 degrees.

Optionally, the earpiece comprises a receiver cavity and a microphone cavity, the receiver cavity and the microphone cavity being separated at least partly by an internal wall, and wherein the earpiece further comprises a filling material arranged in the microphone cavity.

Optionally, the earpiece comprises a protection element, the protection element comprising foamed polymer and circumventing the ear canal portion for forming a seal between an ear canal wall and the ear canal portion.

Optionally, a distance from the first microphone to the ear canal axis is larger than 3 mm when measured parallel to the main plane.

Optionally, the earpiece forms an audio channel from an output port of the receiver to the first end of the ear canal portion.

Optionally, the earpiece forms an audio channel from the first end of the ear canal portion to the second microphone.

Optionally, the earpiece comprises a cable exiting or extending from the ear piece housing for connecting the first microphone, the second microphone, and the receiver to a processing part of the hearing device.

Optionally, the earpiece housing is a two-part housing with a first shell part and a second shell part, the first shell part forming the ear canal portion and a part of the outer ear portion, and the second shell part forming another part of the outer ear portion.

The earpiece may include any of the above features, or any combination of the above features.

A hearing device includes the earpiece according to any of the embodiments described herein.

A hearing device includes the processing part and the earpiece according to any of the embodiments described herein.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
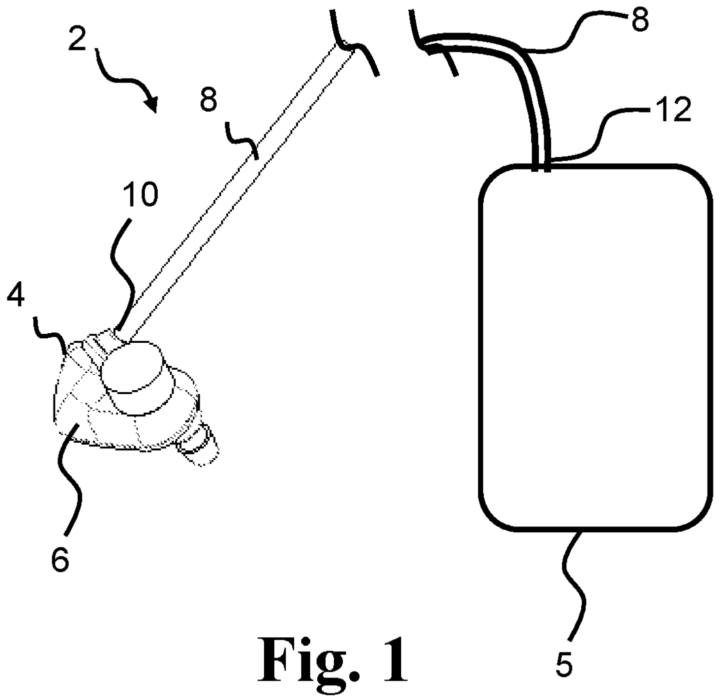
FIG. 1 schematically illustrates an exemplary hearing device.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The present disclosure relates to a hearing device and an ear piece for a hearing device. The hearing device may be a hearing aid or a hearable.

The hearing device may be of the behind-the-ear (BTE) type, or receiver-in-the-ear (RITE) type. The hearing aid may be a binaural hearing aid. The hearing device may comprise a first earpiece and a second earpiece, wherein the first earpiece and/or the second earpiece is/are an earpiece as disclosed herein. The hearing device/earpiece may be a hearing protector. The hearing protector may comprise a first earpiece and a second earpiece, wherein the first earpiece and/or the second earpiece is an earpiece as disclosed herein. The hearing protector may comprise a processing part.

The earpiece comprises an earpiece housing. The earpiece housing may be configured for positioning in the ear of a user, such as in the concha and in the ear canal. The earpiece housing comprises an ear canal portion and an outer ear portion. The ear canal portion extends along an ear canal axis, the ear canal portion having a first end. The first end of the ear canal portion points towards the eardrum of a user when the earpiece is inserted into the ear of a user. An ear canal opening may be arranged at the first end of the ear canal portion. The ear canal opening allows sounds to exit/enter the earpiece housing. A plurality of ear canal openings may be provided in the earpiece housing, e.g. to separate receiver sound and microphone sound. The ear canal opening(s) of the earpiece may each have a diameter in the range from 0.5 mm to 3 mm. The same or different diameters may be applied for different ear canal openings.

The earpiece housing comprises one or more input ports, including a first input port. The input port(s) allows ambient sound to enter the earpiece housing for detection by one or more microphones including the first microphone, e.g. when the earpiece is positioned in the ear canal. The first input port may have a diameter in the range from 0.5 mm to 3 mm. A first input port distance from the first input port (center) to the ear canal axis (also denoted d_input1) may be less than 5 mm, such as less than 3 mm (measured perpendicular to the ear canal axis). A mesh or grating structure may cover the first input port, i.e. dividing the first input port into a number first input port openings. In one or more exemplary earpieces, the distance d_input1 is less than 1 mm. In one or more exemplary earpieces, the distance d_input1 is zero, i.e. the first input port is centered on the ear canal axis. The first input port may coincide with the ear canal axis. A first input port close to the ear canal axis reduces the need for post-processing of first microphone signal from the first microphone. For example, determination and/or application of head related transfer function(s) (HRTF) can be avoided. Further, shadowing effects are reduced and spatial cues are maintained.

The ear canal portion may have an outer diameter (measured perpendicular to the ear canal axis) in the range from 1 mm to 4 mm. The ear canal portion may have a first outer diameter at the first end in the range from 1 mm to 3 mm. The outer diameter or the ear canal portion may vary along the ear canal axis, e.g. to facilitate attachment of a protection element or ear canal adapter.

Preferably, the ear canal portion forms at least a first audio channel part of audio channel(s) from the first end (ear canal opening) to receiver (loudspeaker) and/or microphone, e.g. arranged in the earpiece. The first audio channel part may have a diameter in the range from 0.5 mm to 5 mm. The first audio channel part may have a varying diameter (inner diameter of ear canal portion) along the ear canal axis. For example, the first audio channel part may have an increased diameter at the first end or the ear canal portion, e.g. to accommodate a filter element. The first audio channel part may have a diameter in the range from 0.5 mm to 5 mm.

The ear canal portion may have a length (measured along the ear canal axis) in the range from 2 mm to 20 mm. In one or more exemplary earpieces, the ear canal portion has a length in the range from 3 mm to 15 mm. Thereby, the ear canal wall of the user can be used for fixating the earpiece in the ear canal and/or the ear canal can be sealed inside the ear canal.

The outer ear portion has a first end and a second end and extending along a secondary axis. The secondary axis may be a longitudinal axis of the outer ear portion, e.g. parallel to or extending in the main plane. The outer ear portion optionally has a length (extension from first end to second end), preferably in the range from 3 mm to 30 mm. The length of the outer ear portion may be in the range from 10 mm to 20 mm, e.g. to allow for positioning in the conchae and at the same time provide sufficient volume for earpiece components.

The outer ear portion may have a height in the range from 3 mm to 20 mm. The height of the outer ear portion may be in the range from 7 mm to 13 mm, e.g. to allow for positioning in the conchae and at the same time provide sufficient volume for earpiece components.

The earpiece optionally comprises a cable with a first end connected to the outer ear portion, the cable exiting the outer ear portion along a cable exit axis. The cable may exit the ear piece housing for connecting earpiece housing components, e.g. the first microphone, the second microphone, and/or the receiver, to a processing part of a hearing device. The cable may comprise one or more wires for electrically connecting components of the earpiece, such as a receiver (loudspeaker) and one or more microphones, respectively, to a processor part of the hearing device.

The earpiece housing may comprise a cable port optionally arranged in the outer ear portion. The earpiece may comprise a cable support configured to support the cable in the cable port in the outer ear portion.

The earpiece comprises one or more microphones arranged in the earpiece housing, such as a first microphone and/or a second microphone optionally arranged at least partly in the outer ear portion. The first microphone, also denoted ambient microphone, may be configured to receive/detect ambient audio or sound from the surroundings. The first distance between the first microphone and the first input port, may be at least 2 mm, such as at least 4 mm. In one or more exemplary earpieces, the first distance is about 5 mm, 6 mm, or even larger than 7 mm, e.g. in the range from 7 mm to 10 mm, when measured parallel to a main plane having a main plane normal parallel to a main axis, the main axis forming a first main angle with the ear canal axis less than 30 degrees.

The second microphone may be an ear canal microphone, e.g. for detecting ear canal audio or sound via an ear canal opening in the earpiece housing. Thus, the second microphone may be configured to receive audio from the ear canal, e.g. via the ear canal opening in the ear canal portion. The second microphone may be configured to operate as a bone-conduction microphone.

The earpiece comprises a receiver for providing an audio output signal to the ear canal, e.g. when the earpiece is inserted in the ear of the user. The receiver may provide the audio output via the ear canal opening in the ear canal portion or via an output port in the ear canal portion. The earpiece may comprise a receiver housing also denoted receiver suspension for supporting and/or suspending the receiver in the earpiece. The receiver housing may be made of an elastomer material, such as silicone. The receiver housing may comprise a spout for leading sound from the receiver to the ear canal portion, such as into a first audio channel part in the ear canal portion. The receiver housing may comprise one or more protrusions for supporting the receiver housing in the receiver cavity by contacting an inner surface of the receiver cavity.

The first microphone and the second microphone may be arranged in a common plane. The first microphone and the receiver may be arranged in a common plane. The second microphone and the receiver may be arranged in a common plane. The first microphone, the second microphone, and the receiver may be arranged in a common plane. The wording being arranged in a common plane is to be understood as there exists a plane that crosses or includes at least a part of the two components.

In one or more exemplary earpieces, the main axis forms a first main angle also denoted $\alpha_1$ with the ear canal axis less than 45 degrees. The first main angle may be less than 30 degrees and even less than 15 degrees. The main plane may be perpendicular to the ear canal axis. In one or more exemplary earpieces, the first main angle is in the range from 5 to 15 degrees, such as 10 degrees.

A first input port distance from a center of the first input port to the ear canal axis may be less than 5 mm, e.g. when measured parallel to the main plane. In one or more exemplary earpieces, a first input port distance from a center of the first input port to the ear canal axis is less than 3 mm or even less than 2 mm.

In one or more exemplary earpieces, a distance from a center of the first input port to the first microphone is at least 2 mm, such as at least 4 mm or at least 6 mm, when measured parallel to the main plane.

In one or more exemplary earpieces, the earpiece comprises a first sound guide structure for guiding sound from the first input port to the first microphone. The first sound guide structure may form an audio channel extending parallel to or at an angle less than 20 degrees to the main plane. The first sound guide structure may have an input opening, e.g. in a primary sound guide element of the first sound guide structure, and an output opening, e.g. in a secondary sound guide element of the first sound guide structure. A distance between the input opening and the output opening of the first sound guide structure may be at least 3 mm, such as at least 6 mm, when measured parallel to the main plane.

In one or more exemplary earpieces, the first microphone and one of or both the second microphone and the receiver, when projected into the main plane, are arranged side-by-side with no overlap. In one or more exemplary earpieces, the first microphone and the second microphone and the receiver, when projected into the main plane, are arranged side-by-side with no overlap.

A distance between the first microphone and the second microphone, when projected into the main plane, may be at least 3 mm, such as at least 6 mm.

A distance between the first microphone and the receiver, when projected into the main plane, may be at least 1 mm, such as at least 2 mm. A distance between the first microphone and the receiver, when projected into the main plane, may be at 2.5 mm, 3 mm or even at least 3.5 mm.

The first microphone may have a first membrane with a first membrane normal, wherein the first membrane normal forms a first primary membrane angle with the ear canal axis less than 45 degrees.

The second microphone may have a second membrane with a second membrane normal, wherein the second membrane normal forms a second primary membrane angle with the ear canal axis in the range from 45 degrees to 90 degrees.

A distance from the first microphone to the ear canal axis may be larger than 3 mm when measured parallel to the main plane.

The earpiece may form an audio channel from an output port of the receiver to the first end (with ear canal opening) of the ear canal portion.

The earpiece may form an audio channel from the first end (with ear canal opening) of the ear canal portion to the second microphone.

The earpiece may comprise a cable exiting the ear piece housing for connecting the first microphone, the second microphone, and the receiver to a processing part of the hearing device.

The earpiece housing may be a two-part housing with a first shell part and a second shell part. The first shell part may form the ear canal portion and a part of the outer ear portion. The second shell part may form a part of the outer ear portion.

The first microphone may be arranged in the outer ear portion (fully or at least partly). The second microphone may be arranged in the outer ear portion (fully or at least partly). The receiver may be arranged in the outer ear portion (fully or at least partly). In one or more exemplary ear pieces, the first microphone, the second microphone, and the receiver are arranged in the outer ear portion.

The earpiece may be a hearing protector. Thus, the earpiece may comprise a protection element, e.g. for forming a seal between the ear canal wall and the ear canal portion (when inserted in the ear canal of the user). The protection element may be made of or comprise foamed polymer. The protection element may circumvent the ear canal portion.

The earpiece may comprise one or more cavities, optionally including a receiver cavity and/or a microphone cavity. The receiver and/or the receiver housing may be arranged or accommodated in the receiver cavity. The first microphone and/or the second microphone may be arranged in the microphone cavity. In one or more exemplary earpieces, the second microphone is arranged in the receiver cavity. The earpiece housing may comprise an internal wall for at least partly forming or defining the receiver cavity and/or the microphone cavity. The earpiece may comprise a lid element, e.g. for sealing a receiver cavity of the earpiece and/or separating the receiver cavity and the microphone cavity. Thus, the lid element may define or form a part of the receiver cavity. The receiver cavity and the microphone cavity may be separated at least partly by the internal wall.

The earpiece may comprise a filling material at least partly or fully filling one or more cavities of the earpiece, such as the microphone cavity. The filling material may partly or fully fill the microphone cavity, e.g. such that an air volume in the microphone cavity is less than 50% of the microphone cavity volume, such as less than 20% or even less than 10% of the microphone cavity volume. In one or more exemplary earpieces, an air volume in the microphone cavity is less than 2% of the microphone cavity volume. A small air volume in the microphone cavity contributes to the mechanical strength of the earpiece and/or functions as an internal protection element in reducing or preventing ambient sounds propagating through the inside of the earpiece housing. The filling material may be epoxy. The filling material may comprise one or more elastomers, such as silicone.

The first microphone may be arranged at a distance from the ear canal axis (measured perpendicular to the ear canal axis or parallel to the main plane). The first microphone may be arranged at a distance from the first input port when measured parallel to the main plane. Thereby is provided a compact earpiece, wherein the first input port can be positioned close to the entrance of the ear canal to reduce shadowing effects and/or the need for complex post-processing of the input signal to the first microphone.

The earpiece may comprise a first sound guide structure for guiding sound from the first input port to the first microphone. The first sound guide structure is optionally configured to guide a sound from the first input port to the first microphone in a direction parallel to the main plane. The first sound guide structure may comprise a primary sound guide element and/or a secondary sound guide element. The primary sound guide element may be parallel to the main plane or slightly angled (less than 15 degrees) in relation to the main plane. The secondary sound guide element may be parallel to the main plane or slightly angled (less than 15 degrees) in relation to the main plane. The secondary sound guide element may be a printed circuit board with the first microphone mounted or integrated thereon. The first sound guide structure, e.g. the primary sound guide element, may have an input opening for feeding sound or audio into an audio channel of the first sound guide structure. The first sound guide structure, e.g. the secondary sound guide element, may have an output opening for feeding sound or audio from the audio channel of the first sound guide structure to the first microphone. The audio channel of the first sound guide structure may extend parallel to the main plane.

A distance between the input opening of the primary sound guide element and the output opening of the secondary sound guide element may be at least 3 mm, e.g. when measured parallel to the main plane or in the direction of the secondary axis. In other words, the audio channel of the first sound guide structure may have a length of at least 3 mm, such as at least 6 mm.

The ear piece may form an audio channel from an output port of the receiver to the first end of the ear canal portion.

The ear piece may form an audio channel from the first end of the ear canal portion to the second microphone.

The earpiece housing may be a two-part housing with a first shell part and a second shell part. The first shell part may form the ear canal portion and a part of the outer ear portion. The second shell part may form a part of the outer ear portion.

The first shell part and the second shell part may be assembled along respective first and second edges forming a seam line. The seam line may at least partly (e.g. more than 50%, such as more than 70%) extend in a seam plane with a seam plane normal. A first seam angle between the ear canal axis and the seam plane normal may be less than 45 degrees, such as in the range from 5 to 25 degrees, e.g. about 10 degrees. A second seam angle between the main plane and the seam plane may be less than 20 degrees. A small second seam angle facilitate easy manufacture of the earpiece. The first input port may be arranged in the second shell part. The seam plane may be parallel to the main plane, i.e. the second seam angle may be zero, or the seam plane may be slightly angled (e.g. less than 20 degrees) in relation to the main plane.

The first microphone may have a first membrane with a first membrane normal, wherein the first membrane normal forms a first primary membrane angle with the ear canal axis. The first membrane angle may be less than 45 degrees, such as in the range from 5 to 25 degrees, e.g. 10 degrees. The first membrane may be parallel with the main plane or slightly angled (less than 15 degrees) in relation to the main plane. The first membrane normal may be parallel with the main axis or form a first secondary membrane angle less than 45 degrees with the main axis. The first secondary membrane angle may be less than 15 degrees. The first membrane normal may be perpendicular to the main axis or form a first secondary membrane angle larger than 45 degrees with the main axis. The first secondary membrane angle may be in the range from 75 degrees to 105 degrees.

The second microphone may have a second membrane with a second membrane normal, wherein the second membrane normal forms a second primary membrane angle with the ear canal axis in the range from 45 degrees to 90 degrees, such as about 75 degrees to 80 degrees. The second membrane may be perpendicular to the first membrane of the first microphone or form a microphone angle between 60 degrees and 90 degrees with the first membrane of the first microphone. The second membrane may be perpendicular to the main plane form an angle between 60 degrees and 90 degrees with the main plane. The second membrane normal may be perpendicular to the main axis or form a second secondary membrane angle in the range from 60 degrees to 90 degrees with the main axis. The second secondary membrane angle may be less than 45 degrees.

The first microphone may be separated from the receiver along the secondary axis, i.e. with no overlap along the secondary axis. In other words, the first microphone may be arranged at a distance from the receiver along the secondary axis. The distance between the first microphone and the receiver along the secondary axis may be larger than 1 mm, such as larger than 2 mm.

When projecting the first microphone, the second microphone and the receiver into the main plane, i.e. when seen in the direction of the main axis, the first microphone may be separated from the receiver. The second microphone may be separated from the first microphone. The second microphone may be separated from the receiver. In other words, the first microphone and the receiver may be arranged side-by-side with no overlap when seen in the direction of the main axis. The first microphone and the second microphone may be arranged side-by-side with no overlap when seen in the direction of the main axis. The second microphone and the receiver may be arranged side-by-side with no overlap when seen in the direction of the main axis. The distance between the first microphone and the second microphone may be at least 3 mm, such as at least 6 mm, when measured parallel to the main plane.

FIG. 1 shows an exemplary hearing device. The hearing device 2 comprises an earpiece 4 and a processing part 5, the earpiece 4 comprising an earpiece housing 6 and a cable 8 connected to the earpiece housing 6 at a first end 10 of the cable. A second end 12 of the cable 8 is connected or connectable to the processing part 5 of the hearing device 2.

Figure 2:
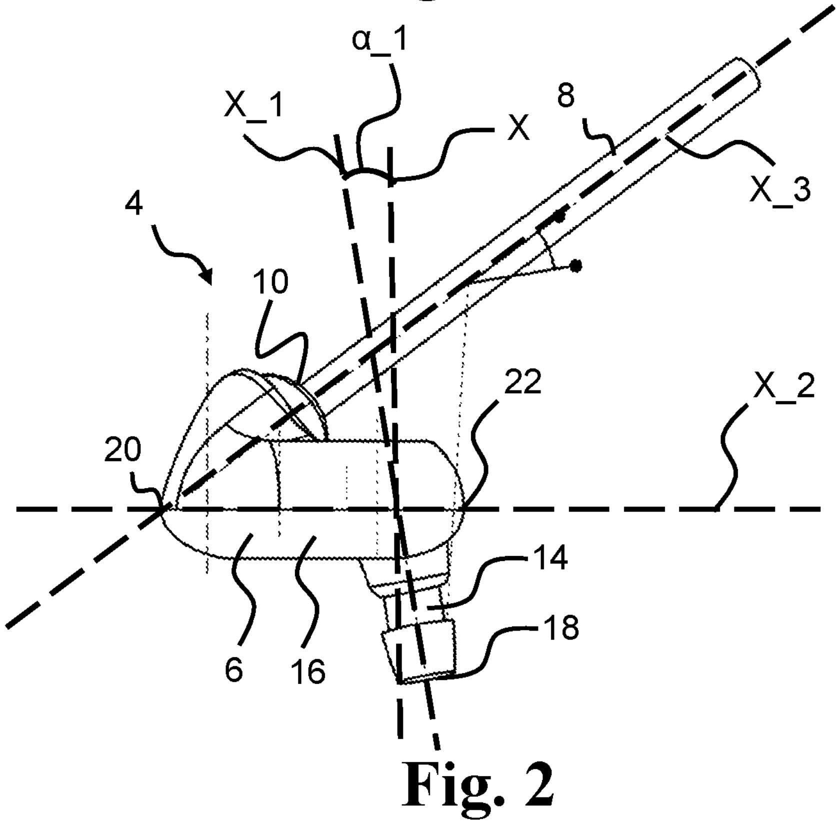
FIG. 2 is a first view of an exemplary earpiece.

FIG. 2 shows a first view of earpiece 4. The earpiece 4 comprises an earpiece housing 6 comprising an ear canal portion 14 and an outer ear portion 16. The ear canal portion 14 extends along an ear canal axis $X_1$ with an ear canal plane perpendicular to the ear canal axis $X_1$. The ear canal portion 14 has a first end 18, and the outer ear portion 16 has a first end 20 and a second end 22 and extending along a secondary axis $X_2$. The earpiece 4 comprises a cable 8 with a first end 10 connected to the outer ear portion 16, the cable 8 exiting the outer ear portion 16 along a cable exit axis $X_3$. A main plane is perpendicular to main axis X. The first main angle $\alpha_1$ between the main axis and the ear canal axis is 10 degrees.

Figure 3:
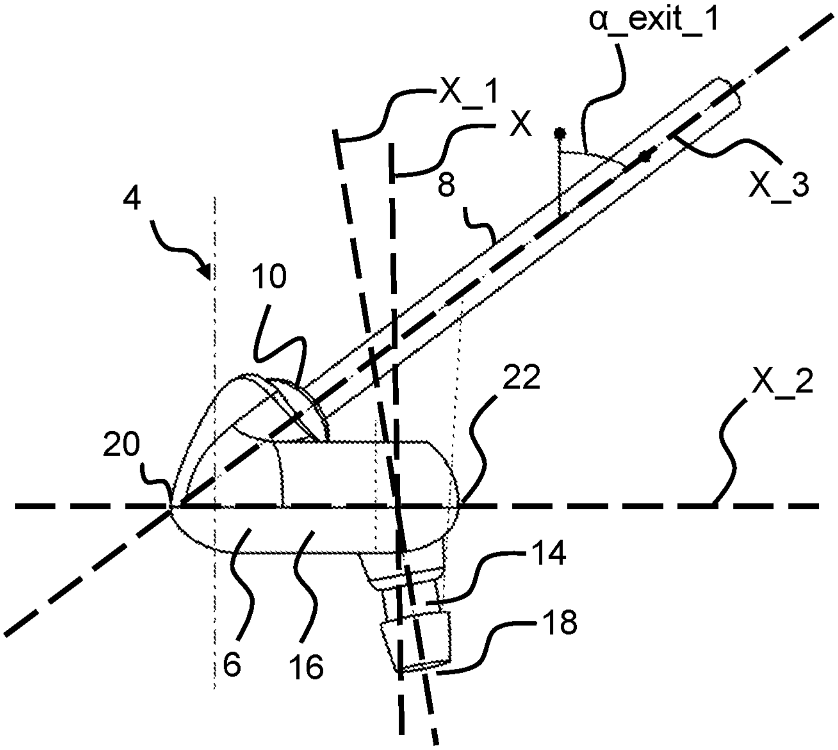
FIG. 3 is a first view of an exemplary earpiece.

FIG. 3 shows the first view of earpiece 4. The cable exit axis $X_3$ forms a first exit angle also denoted $\alpha_{exit\_1}$ with respect to the main axis. The first exit angle $\alpha_{exit\_1}$ is optionally in the range from 20 degrees to 60 degrees, e.g. about 40 degrees.

Figure 4:
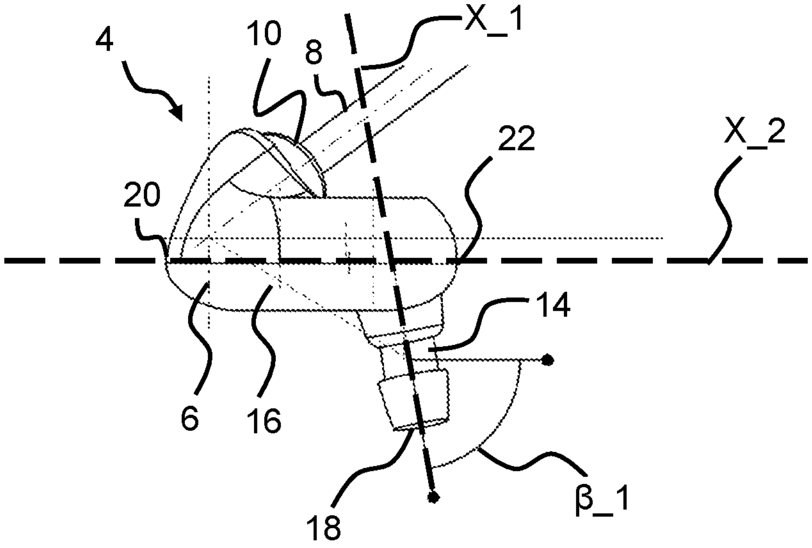
FIG. 4 is a first view of an exemplary earpiece.

FIG. 4 shows the first view of earpiece 4. The secondary axis $X_2$ forms a first secondary angle $\beta_1$ with respect to the ear canal axis $X_1$. The first secondary angle $\beta_1$ is optionally in the range from 75 degrees to 85 degrees, e.g. about 80 degrees. A first secondary angle smaller than 90 degrees, e.g. a slightly angled ear canal plane (e.g. 5 to 15 degrees) in relation to the secondary axis, allows for an earpiece that utilizes the available space in the concha.

Figure 5:
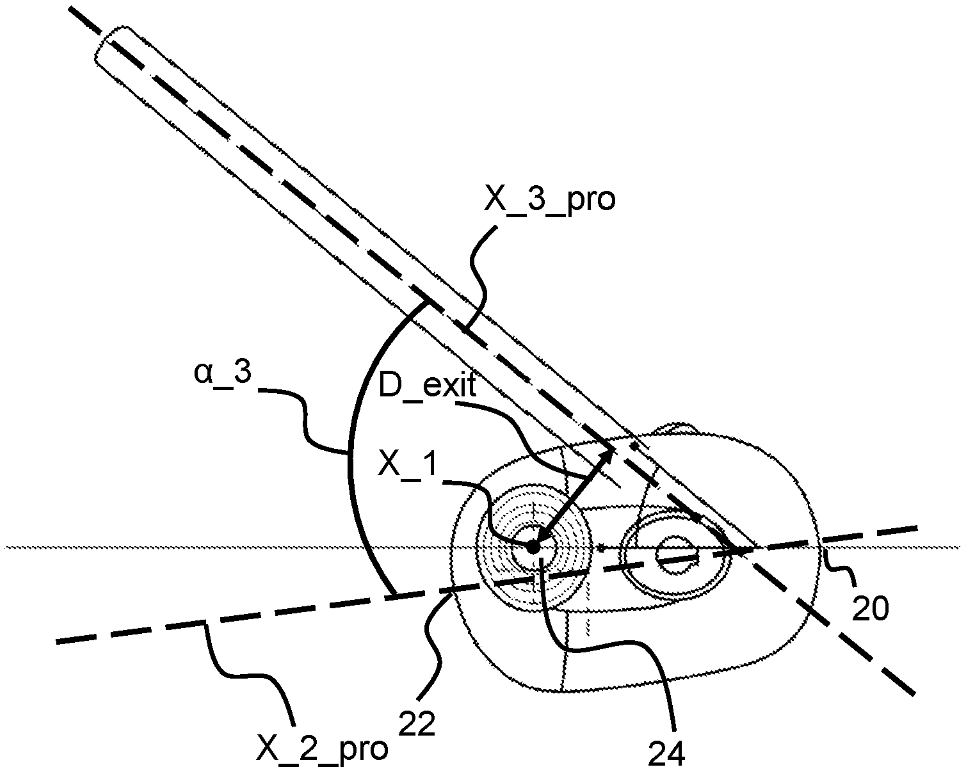
FIG. 5 is a second view of an exemplary earpiece.

FIG. 5 shows a second view of the earpiece 4 as seen in the direction of the ear canal axis. A first sound opening 24 is arranged at the first end 18 of the ear canal portion. An audio channel connects the first sound opening and the output of the receiver. An audio channel connects the first sound opening and the input to the second microphone. A first audio channel part in the ear canal portion forms a common part or the audio channels from the first end (ear canal opening) to receiver (loudspeaker) and the second microphone. The first sound opening (ear canal opening) 24 of the earpiece has a circular or oval cross-sectional shape with a (largest) diameter of about 3.0 mm and coincides with the ear canal axis. The secondary axis $X_2$ is projected into a projected secondary axis $X_{2\_pro}$ in the ear canal plane and the exit axis $X_3$ is projected into a projected exit axis $X_{3\_pro}$ in the ear canal plane. The angle between the projected secondary axis $X_{2\_pro}$ and the projected exit axis $X_{3\_pro}$ is also denoted $\alpha_3$ and may be in the range from 25 to 60 degrees, e.g. about 48 degrees The secondary axis may form a first secondary angle also denoted $\beta_1$ with respect to the ear canal axis. The first secondary angle optionally is in the range from 45 to 90 degrees, such as from 75 to 85 degrees. In one or more exemplary earpieces, the first secondary angle is about 80 degrees. A first secondary angle smaller than 90 degrees, e.g. a slightly angled ear canal plane (e.g. 5 to 15 degrees) in relation to the secondary axis, allows for an earpiece that utilizes the available space in the concha.

A distance $D_{exit}$ between the projected exit axis $X_{3\_pro}$ and the ear canal axis $X_1$ in the ear canal plane may be in the range from 2 mm to 20 mm, such as about 10 mm. Thereby, the first exit axis is shifted away or distanced from the ear canal axis, e.g. enabling arrangement of a first input port close to or coinciding with the ear canal axis.

Figure 6:
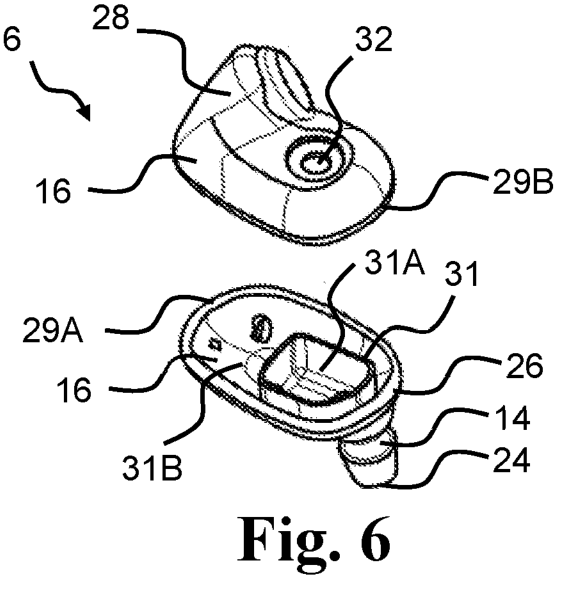
FIG. 6 schematically illustrates shell parts of an earpiece housing.

FIG. 6 shows a first shell part 26 and a second shell part 28 of the earpiece housing 6. The first shell part 26 forms the ear canal portion 14 and a part of the outer ear portion 16. The second shell part 28 forms a part of the outer ear portion 16. The first shell part 26 and the second shell part 28 are assembled along respective first and second edges 29A, 29B forming a seam line extending in a seam plane with a seam plane normal. A first seam angle between the secondary axis and the seam plane normal is optionally in the range from 75 to 105 degrees. A second seam angle between the ear canal axis and the seam plane normal is in the range from 5 to 25 degrees. The second shell part 28 has a first input port 32 in the outer ear portion for allowing ambient sound to enter the inside of earpiece housing for detection with the first microphone. The first input port 32 is circular and has a diameter of about 2.0 mm. The earpiece housing 6 comprises an internal wall 31 for at least partly forming or defining a receiver cavity 31A and a microphone cavity 31B. The internal wall is formed in the first shell part 26.

Figure 7:
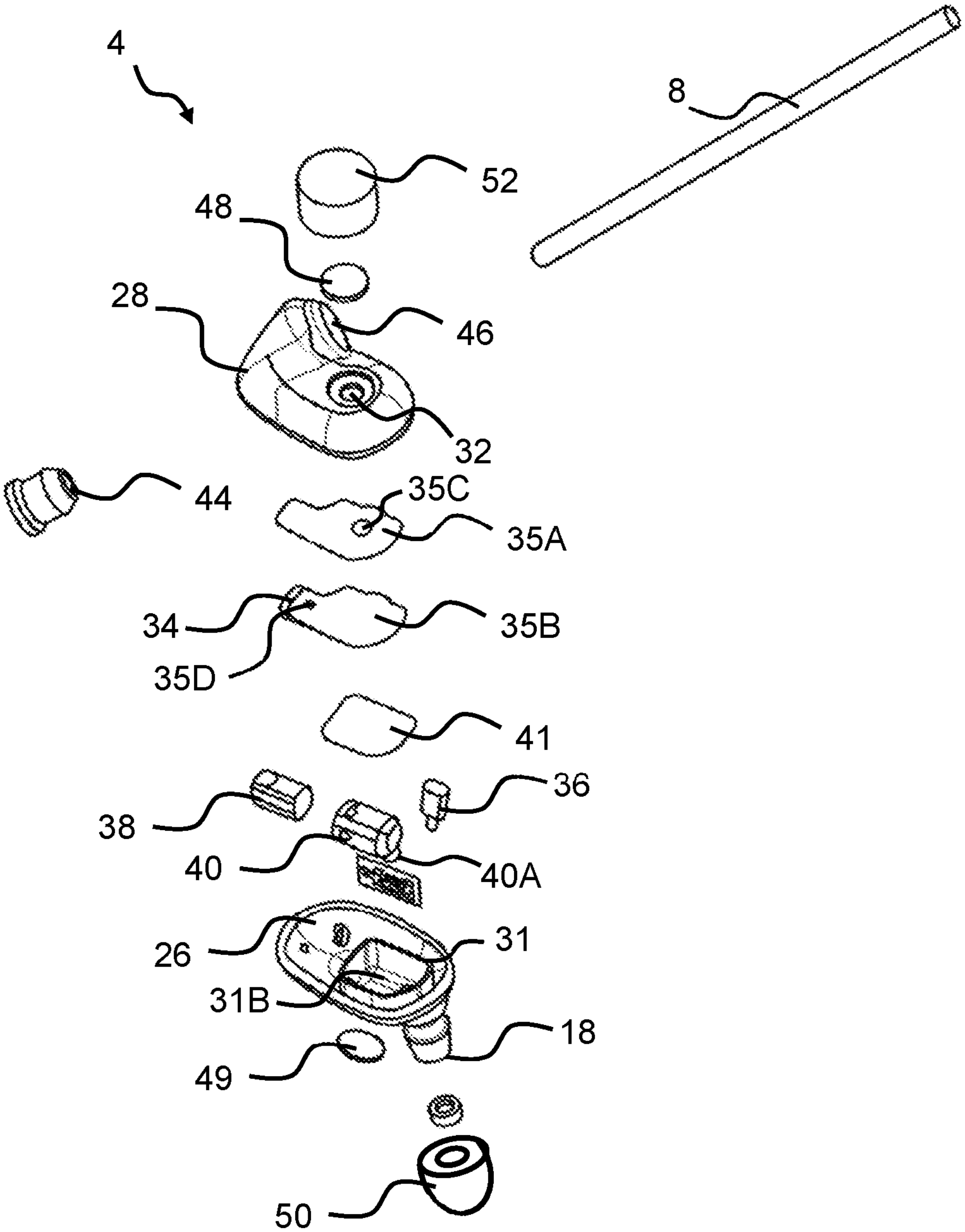
FIG. 7 is an exploded view of an exemplary earpiece.

FIG. 7 shows an exploded view of earpiece 4. The earpiece 4 comprises a first microphone 34 arranged in the outer ear portion and configured to receive audio from the surroundings via first input port 32 in outer ear portion and first sound guide structure comprising primary sound guide element 35A and secondary sound guide element 35B. The sound guide structure forms an audio path or channel between input opening 35C of the primary sound guide element 35A and output opening 35D of the secondary sound guide element 35B. The earpiece 4 comprises a second microphone 36 also denoted ear canal microphone and arranged at least partly in the outer ear portion and configured to receive audio from the ear canal via first sound opening 24 at the first end of the ear canal portion. The earpiece 4 comprises a receiver 38 (loudspeaker) that when assembled is arranged in receiver housing 40. The receiver 38 and the receiver housing 40 are, when assembled, arranged within receiver cavity 31B formed by internal wall 31 and lid element 41. The receiver 38 generates sound that is transmitted via spout 40A of the receiver housing 40 through audio channel in the earpiece housing (ear canal portion) from the outer ear portion to the first sound opening 24 at the first end of the ear canal portion. The internal wall 31 and the lid element 41 separates the microphone cavity 31A and the receiver cavity 31B.

The first input port 32 (center) is within 2 mm of the ear canal axis thereby reducing the need for complex processing of first microphone signal from the first microphone due to the reduced shadow effects and therefore detection of a more lifelike input signal with the first microphone. The earpiece 4 optionally comprises a printed circuit board 42. Optional cable support 44 of earpiece 4 is configured to support cable 8 in cable port 46 of the outer ear portion 16. The earpiece 4 optionally comprises a filter element 48 for preventing debris from entering the first input port 32. Optional cover element 49 may cover filling opening (not shown) in the first shell part. The filling opening is used for filling microphone cavity 31A with filling material after assembly of the first shell part 26 and the second shell part 28.

The earpiece 4 comprises a protection element 50 for forming a seal between the ear canal wall and the ear canal portion 14. The protection element comprises foamed polymer and is configured to circumvent the ear canal portion. The protection element 50 may be replaced by an ear canal adapter. The ear canal adapter may comprise a vent.

Figure 8:
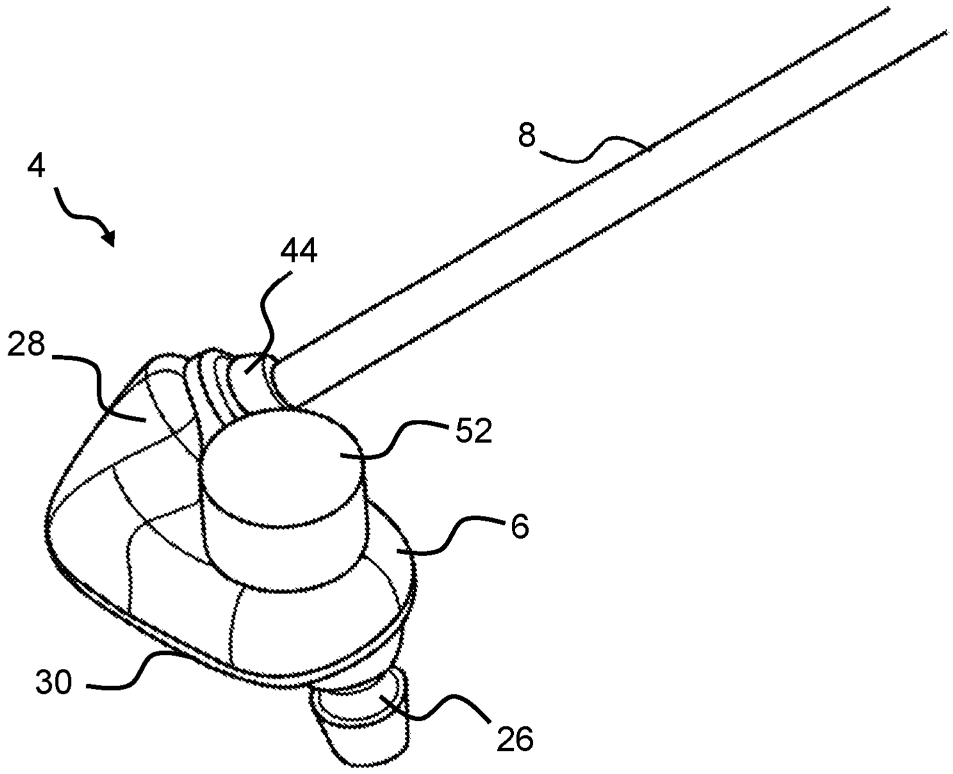
FIG. 8 is a third view of an exemplary earpiece.

FIG. 8 shows a third view of the earpiece 4. The first shell part 26 and the second shell part 28 of the earpiece housing 6 are assembled along seam line 30 extending (more than 80%) in a seam plane parallel to the main plane. Optionally, the earpiece 4 comprises a filter element 52 for filtering wind noise and attached to the outer ear portion of the earpiece housing 6.

Figure 9:
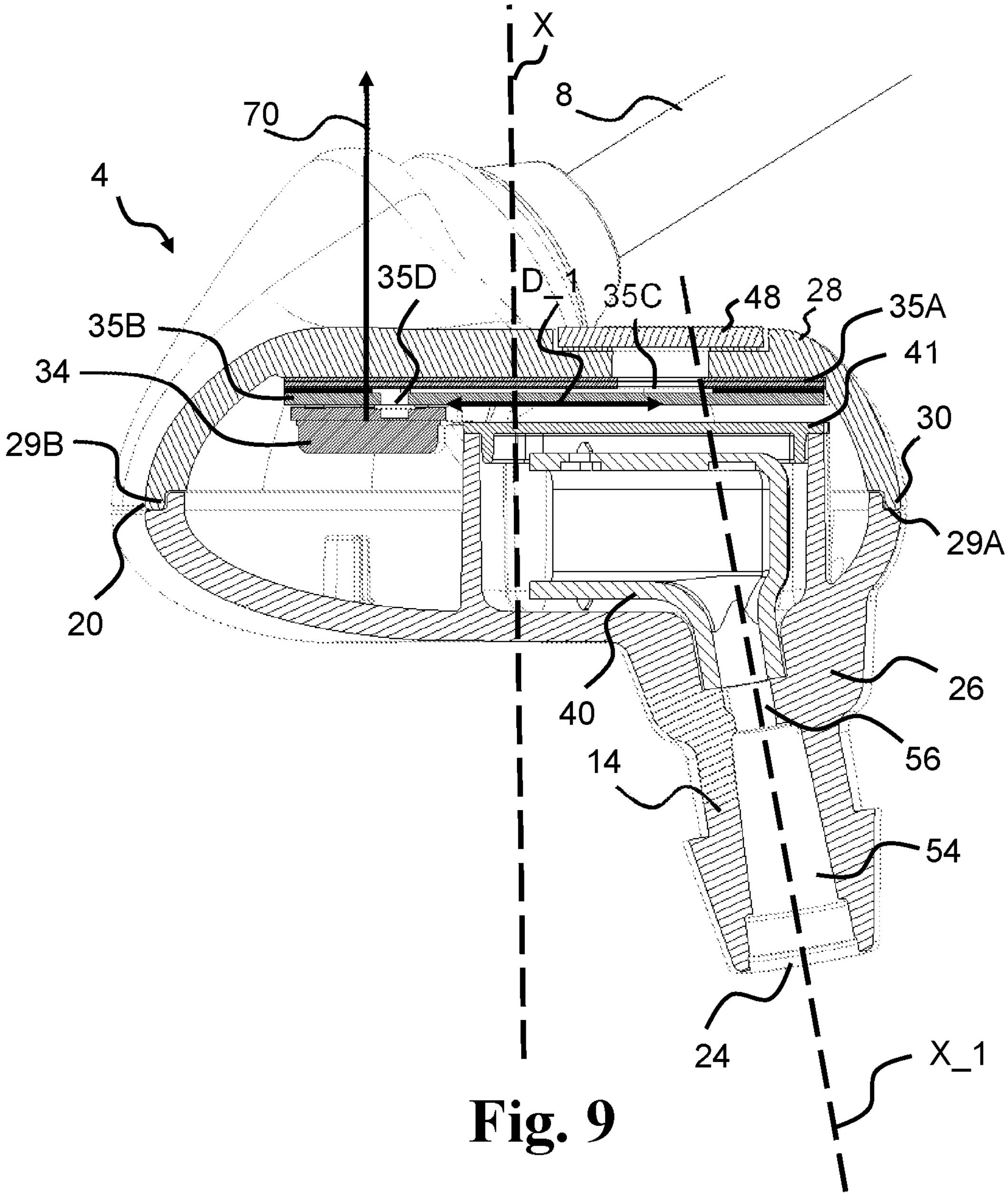
FIG. 9 is a schematic cross-section of an exemplary earpiece.

FIG. 9 shows a schematic cross-section of the ear piece 4 in a plane spanned by the main axis X and the ear canal axis X_1.

The first microphone 34 has a first membrane with a first membrane normal, wherein the first membrane normal 70 is parallel to the main axis X and thus forms a first membrane angle with the ear canal axis less than 45 degrees.

The seam line 30 along edges 29A and 29B forms a seam plane. The seam plane is optionally perpendicular to the first membrane normal, i.e. the first membrane of the first microphone 34 is parallel to the seam plane. The first microphone 34 is arranged at a first distance D_1 from the first input port (center). The first distance D_1 (measured in main plane) is at least 2 mm, e.g. about 5 mm. The first main angle between the main axis X and the ear canal axis X_1 is 10 degrees. The audio channel/path formed by primary sound guide element 35A and secondary sound guide element 35B has a length larger than 4 mm, e.g. about 6.5 mm, when measured parallel to the main plane as the center-to-center distance between input opening 35C and output opening 35D. The first microphone is distanced at least 3 mm, such as 6 mm, from the ear canal axis X_1 (measured in the main plane along the secondary axis).

The ear canal portion 14 forms at least a first audio channel part 54 of audio channel(s) from the first end (ear canal opening) to receiver (loudspeaker) and/or microphone, e.g. arranged in the earpiece. The first audio channel part may have a diameter in the range from 0.5 mm to 3 mm. The first audio channel part branches into a primary audio channel part 56 and a secondary audio channel part 58 (see FIG. 10), the primary audio channel part 56 communicating receiver output to the first sound opening 24, and the secondary audio channel part 58 communicating sound from the ear canal to the second microphone.

Figure 10:
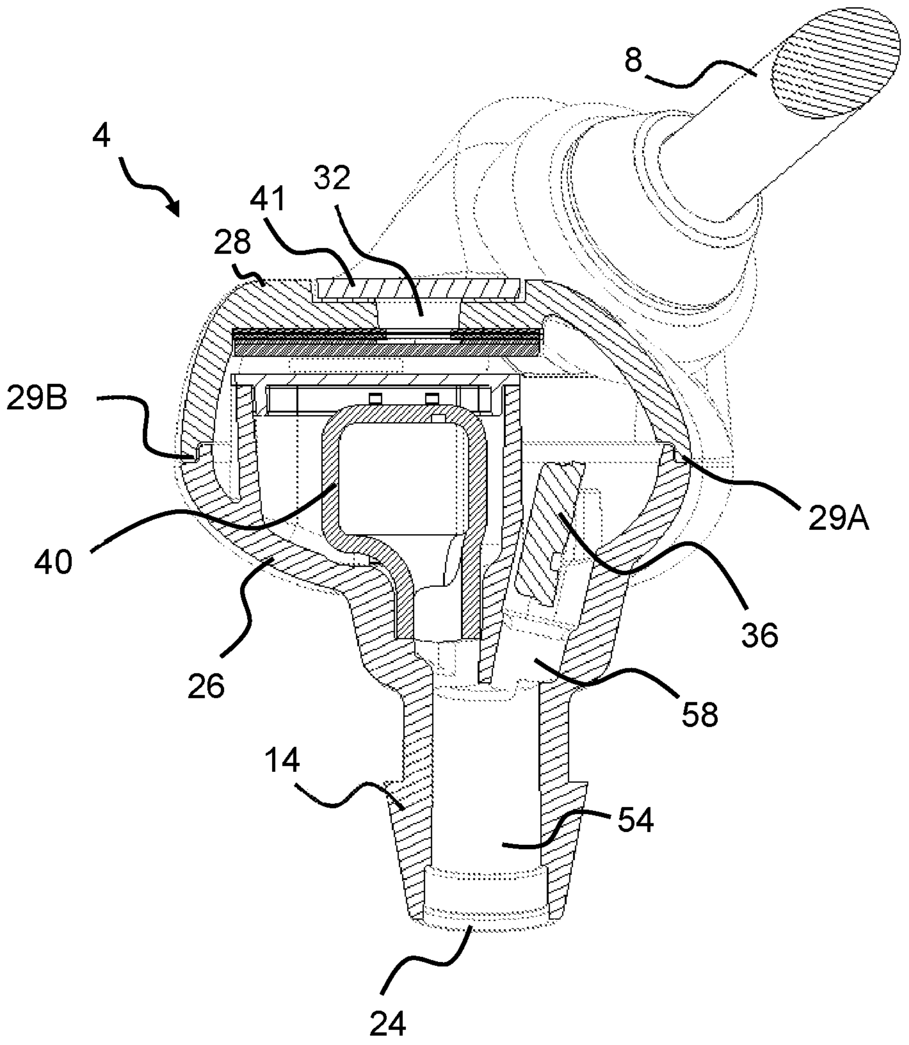
FIG. 10 is a schematic cross-section of an exemplary earpiece.

FIG. 10 shows a schematic cross-section of the ear piece 4 in a secondary plane perpendicular to the secondary axis X_2. The second microphone 36 has a second membrane with a second membrane normal, wherein the second membrane normal forms a second membrane angle with the ear canal axis in the range from 45 degrees to 90 degrees, such as in the range from 70 to 85 degrees. The second microphone 36 communicates with the first sound opening 24 via the first audio channel part 54 and the secondary audio channel part 58.

Figure 11:
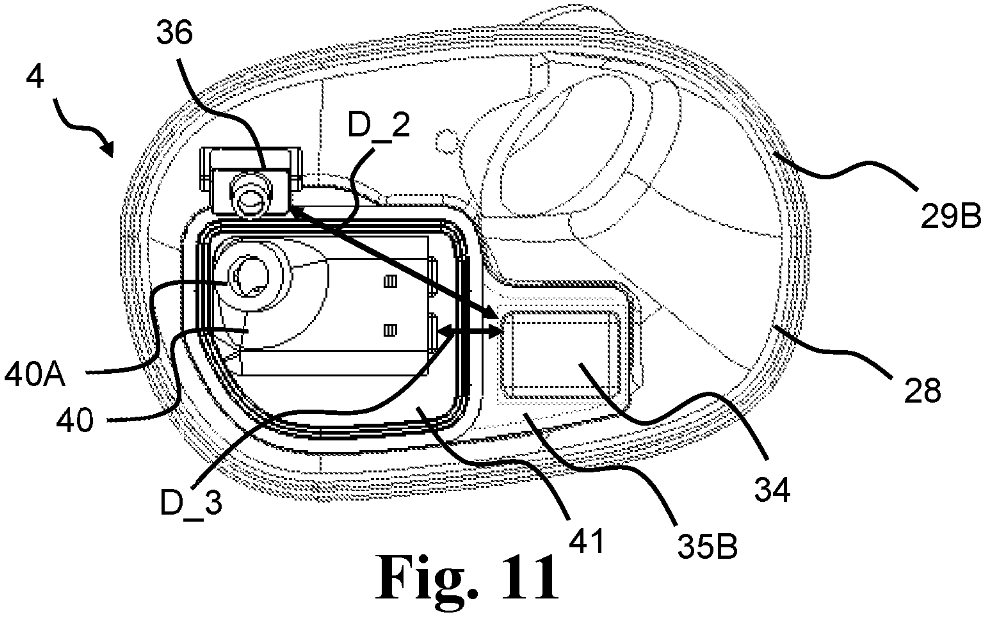
FIG. 11 is a fourth view of an exemplary earpiece

FIG. 11 shows a fourth view of the earpiece 4 at least without the first shell part 26 in the direction of the main axis X illustrating the position of the receiver and microphones in the earpiece. The first microphone 34 and the second microphone 36 are arranged side-by-side with no overlap. The first microphone 34 and the receiver 38 (arranged in receiver housing 40) are arranged side-by-side with no overlap. The second microphone 36 and the receiver 38 (arranged in receiver housing 40) are arranged side-by-side with no overlap. A distance D_2 between the first microphone and the second microphone, when projected into the main plane, is at least 3 mm, e.g. larger than 5 mm. A distance D_3 between the first microphone and the receiver, when projected into the main plane, is at least 2 mm. The lid element 41, the primary sound guide element (not shown) and the secondary sound guide element 35B are parallel to the main plane. The primary sound guide element and the secondary sound guide element form an audio channel extending parallel to the main plane. The secondary sound guide element 35B is a printed circuit board and is optionally glued to the lid element 41.

Figure 12:
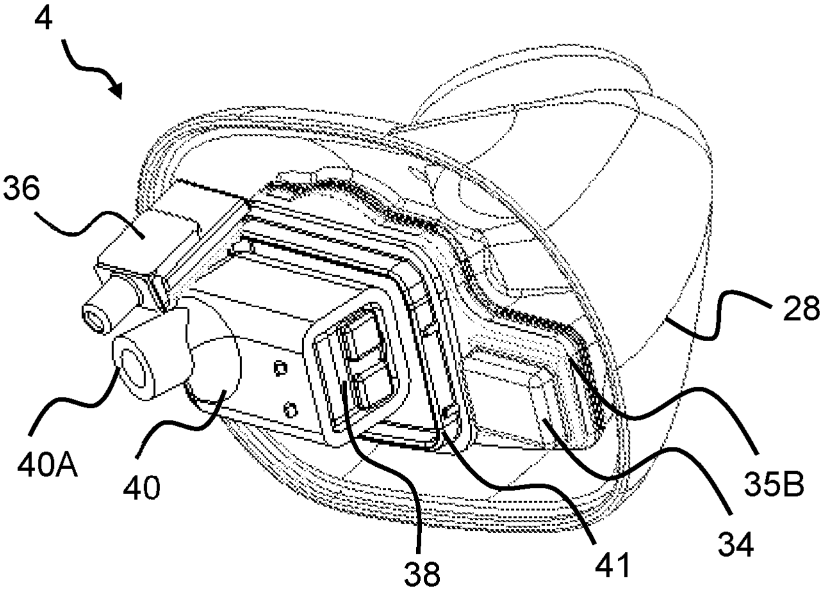
FIG. 12 is a fifth view of an exemplary earpiece.

FIG. 12 shows a fifth view being a perspective view of the earpiece 4 at least without the first shell part 26. The receiver 38 is arranged inside receiver housing 40 for feeding sound or audio through spout 40A of receiver housing 40 towards the first sound opening in ear canal portion.

Figure 13:
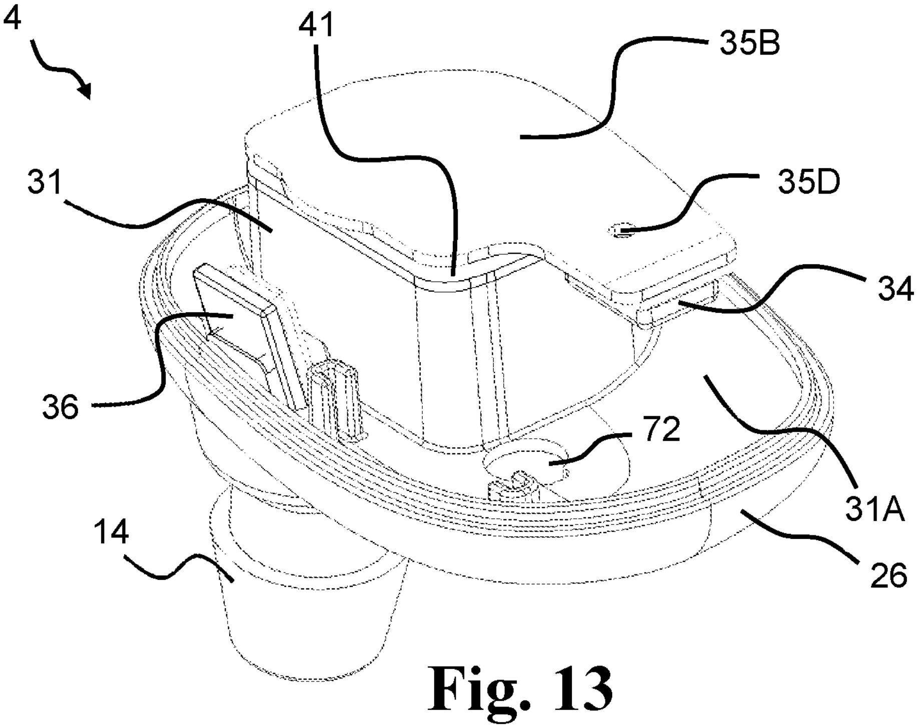
FIG. 13 is a sixth view of an exemplary earpiece.

FIG. 13 shows a sixth view being a perspective view of the earpiece 4 at least without the second shell part 28 and the primary sound guide element 35A. The internal wall 31 and the lid element forms receiver cavity accommodating the receiver and receiver housing. A filling port 72 is formed in the first shell part 26 for allowing filling of microphone cavity 31A of the earpiece with filling material, such as epoxy or silicone, after assembly of first shell part 26 and second shell part. The internal wall 31 and lid element 41 ensures that the filling material (not shown) does not flow into the receiver cavity, thereby securing an air-filled receiver cavity with a sufficient air volume to provide a correct function of the receiver arranged in the receiver cavity.

The use of the terms "first", "second", "third" and "fourth", etc. does not imply any order, but are included to identify individual elements. Moreover, the use of the terms first, second, etc. does not denote any order or importance, but rather the terms first, second, etc. are used to distinguish one element from another. Note that the words first, second, etc. are used here and elsewhere for labelling purposes only and are not intended to denote any specific spatial or temporal ordering unless otherwise indicated. Furthermore, the labelling of a first element does not imply the presence of a second element and vice versa.

It should be noted that the term "distance" (i.e., from a first item to a second item), as used in this specification, may refer to a length or an amount of space between a first point and a second point. The first point may be on/in the first item, or may be away from the first item and associated with the first item (e.g., the first point may be on a projection line extending from the first item). Similarly, the second point may be on/in the second item, or may be away from the second item and associated with the second item (e.g., the second point may be on a projection line projected extending from the second item). For example, the "distance" in the phrase "the first microphone at a first distance from the first input port" may refer to a distance measured from (1) a point on the first microphone (e.g., at an edge of the first microphone), a point in the first microphone (e.g., a center or midpoint in the first microphone), or a point on a projection line extended from any part of the first microphone, to (2) an edge of the first input port, a point in the first input port (e.g., a center of the first input port), or a point on a projection line extending from any part of the first input port.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

2 hearing device
4 earpiece
5 processing part
6 earpiece housing
8 cable
10 first end of cable
12 second end of cable
14 ear canal portion
16 outer ear portion
18 first end of ear canal portion
20 first end of outer ear portion
22 second end of outer ear portion
24 first sound opening
26 first shell part of earpiece housing
28 second shell part of earpiece housing
29A first edge
29B second edge
30 seam line
31 internal wall
31A microphone cavity
31B receiver cavity
32 first input port
34 first microphone
35A primary sound guide element
35B secondary sound guide element
35C input opening of primary sound guide element
35D output opening of secondary sound guide element
36 second microphone
38 receiver
40 receiver housing
40A spout
41 lid element
42 printed circuit board
44 cable support
46 cable port
48 filter element
49 cover element
50 protection element
52 filter element
54 first audio channel part
56 primary audio channel part
58 secondary audio channel part
70 first membrane normal
72 filling port
X main axis
X_1 ear canal axis
X_2 secondary axis
X_2_pro projected secondary axis
X_3 cable exit axis
X_3_pro projected exit axis
α_1 first main angle
α_exit_1 first exit angle
α_3 angle between the projected secondary axis and the projected exit axis
β_1 first secondary angle
D_1 first distance between first microphone and the first input port in the main plane
D_2 distance between first microphone and second microphone in main plane
D_3 distance between first microphone and receiver in main plane
D_exit distance between the projected exit axis and the ear canal axis

The invention claimed is:

1. An earpiece comprising:

an earpiece housing comprising a first portion and a second portion, the first portion extending along an ear canal axis of the earpiece, wherein the second portion of the earpiece housing comprises an exterior surface having a first opening, and a channel extending from the first opening through a wall of the second portion of the earpiece housing, and wherein the channel extends to a second opening defined by an inner part of the second portion of the earpiece housing;

a first microphone for detecting ambient sound via the channel;

a second microphone; and a receiver for providing an audio output signal;

wherein the first microphone is at a distance from the first opening, and wherein the first microphone is closer to the second opening defined by the inner part of the second portion of the earpiece housing than to the first opening.

2. The earpiece of claim 1, wherein the first portion of the earpiece housing is detachably coupled to a part of the second portion of the earpiece housing.

3. The earpiece of claim 2, wherein the first portion is configured to at least partially contain the receiver and the second microphone.

4. The earpiece of claim 1, wherein a largest area occupied by a cross-section of the second portion lies within a plane, and wherein the ear canal axis forms a non-perpendicular angle with respect to the plane.

5. The earpiece of claim 1, wherein the first portion has a sound output port, and wherein the earpiece further comprises a structure detachably coupled to the sound output port, wherein the structure has a cross-sectional dimension that is less than a cross-sectional dimension of the sound output port.

6. The earpiece of claim 5, further comprising a dome-shape component detachably coupled to the sound output port.

7. The earpiece of claim 6, wherein the dome-shape component is configured to cover at least a part of the structure.

8. The earpiece of claim 1, wherein a shortest distance from a center of the first opening to the ear canal axis is less than 5 mm when measured along an axis that is perpendicular to the ear canal axis.

9. The earpiece of claim 1, wherein an extent of the second microphone, and an extent of the receiver, when projected onto a plane, are arranged side-by-side with no overlap.

10. The earpiece of claim 1, wherein the earpiece comprises a receiver cavity and a microphone cavity, the receiver cavity and the microphone cavity being separated at least partly by an internal wall of the earpiece housing.

11. The earpiece of claim 1, further comprising a protection element, the protection element surrounding the first portion.

12. The earpiece of claim 1, further comprising an audio channel from an output port of the receiver to an end of the first portion.

13. The earpiece of claim 1, further comprising a sound receiving channel in the first portion, the sound receiving channel extending to the second microphone.

14. The earpiece of claim 1, wherein the channel has a channel axis, and the first microphone is offset from the first opening.

15. The earpiece of claim 14, wherein the first microphone is offset from the first opening in a direction that is parallel to the channel axis of the channel.

16. The earpiece of claim 15, wherein the first microphone is also offset from the first opening in another direction that is perpendicular to the channel axis of the channel.

17. The earpiece of claim 1, wherein the earpiece comprises a sound guide structure disposed between the second opening and the first microphone, the sound guide structure configured to guide sound from the second opening to the first microphone.

18. The earpiece of claim 17, wherein the sound guide structure defines a sound transmission path having a primary direction that is non-parallel to the ear canal axis of the earpiece.

19. The earpiece of claim 1, wherein the earpiece housing has a first side and a second side opposite from the first side, the ear canal axis being between the first side and the second side of the earpiece housing.

20. A hearing device comprising the earpiece of claim 1.

21. A hearing device comprising a processing part and the earpiece of claim 1.

22. The earpiece of claim 1, wherein the channel defines a first sound path, wherein the earpiece further comprises a sound guide structure defining a second sound path that is in communication with the first sound path, and wherein at least a part of the second sound path is longer than the first sound path and is non-parallel to the first sound path.

23. The earpiece of claim 22, wherein the second sound path extends from the second opening that is at an interior surface of the wall of the second portion of the earpiece housing.

* * * * *